US006185693B1

United States Patent
Garmire et al.

(10) Patent No.: US 6,185,693 B1
(45) Date of Patent: *Feb. 6, 2001

(54) SYNCHRONOUS INTERFACE FOR TRANSMITTING DATA IN A SYSTEM OF MASSIVELY PARALLEL PROCESSORS

(75) Inventors: Derrick Leroy Garmire, Kingston; Robert Stanley Capowski, Verbank; Daniel Francis Casper, Poughkeepsie; Christine Marie Desnoyers, Pine Bush; Frank David Ferraiolo, New Windsor; Marten Jan Halma, Poughquag; Robert Frederick Stucke, Saugerties, all of NY (US)

(73) Assignee: International Business Machines Corporation, Armonk, NY (US)

(*) Notice: Under 35 U.S.C. 154(b), the term of this patent shall be extended for 0 days.

This patent is subject to a terminal disclaimer.

(21) Appl. No.: 08/669,667

(22) Filed: Jun. 24, 1996

Related U.S. Application Data

(60) Continuation of application No. 08/451,804, filed on May 26, 1995, now abandoned, which is a division of application No. 08/261,603, filed on Jun. 17, 1994, now abandoned.

(51) Int. Cl.[7] ........................................................ G06F 1/04
(52) U.S. Cl. ............................. 713/503; 709/248; 710/61
(58) Field of Search ...................... 710/126, 61; 342/174; 375/356, 354; 709/248; 713/460, 503

(56) References Cited

U.S. PATENT DOCUMENTS

| 3,883,870 | * | 5/1975 | Kunz ..................................... 342/174 |
| 5,086,500 | * | 2/1992 | Greub .................................... 395/550 |
| 5,258,933 | * | 11/1993 | Johnson et al. ....................... 364/602 |
| 5,299,193 | * | 3/1994 | Szczepanek .......................... 370/85.1 |
| 5,388,249 | * | 2/1995 | Hotta et al. ........................... 395/550 |
| 5,398,262 | * | 3/1995 | Ahuja .................................... 375/356 |
| 5,422,918 | * | 6/1995 | Vartti et al. ........................... 375/371 |
| 5,428,764 | * | 6/1995 | Maskas ................................. 395/550 |
| 5,432,823 | * | 7/1995 | Gasbarro et al. ..................... 375/356 |
| 5,513,377 | * | 4/1996 | Capowski et al. ..................... 710/61 |
| 5,522,088 | * | 5/1996 | Halma et al. .......................... 710/61 |

FOREIGN PATENT DOCUMENTS

| 02166918 | * | 6/1990 | (JP) ................................. H03L/7/00 |
| 0653955 | * | 2/1994 | (JP) ................................. H04L/7/10 |

\* cited by examiner

*Primary Examiner*—John A. Follansbee
(74) *Attorney, Agent, or Firm*—Lynn L. Augspurger; Venable

(57) ABSTRACT

A massively parallel system has a self-timed interface (STI) in which a clock signal clocks bit serial data onto a parallel, electrically conductive bus and the clock signal is transmitted on a separate line of the bus. The received data on each line of the bus is individually phase aligned with the clock signal. Digital data is transmitted at high speeds via the parallel bus to provide a scalable communications network for parallel processing systems while eliminating precise bus length and system clock rates as a critical or limiting factor.

3 Claims, 8 Drawing Sheets

64 Node Wiring Diagram

128 Node Wiring Diagram

SYNCHRONOUS INTERFACE FOR TRANSMITTING DATA IN A SYSTEM OF MASSIVELY PARALLEL PROCESSORS

This is a continuation of application Ser. No. 08/451,804, filed May 26, 1995, now abandoned, which is a division of application Ser. No. 08/261,603, filed Jun. 17, 1994, now abandoned.

CROSS REFERENCE TO RELATED APPLICATIONS

The present United States patent application is related to the following United States patent applications incorporated herein by reference:

Application Ser. No. 08/262,087, filed Jun. 17, 1994, entitled "Digital Phase Locked Loop with Improved Edge Detector," and assigned to the assignee of this application, now U.S. Pat. No. 5,487,095.

Application Ser. No. 08/261,514, filed Jun. 17, 1994, entitled "Self-Timed Interface," and assigned to the assignee of this application, now U.S. Pat. No. 5,592,553.

Application Ser. No. 08/261,522, filed Jun. 17, 1994, entitled "Multiple Processor Link," and assigned to the assignee of this application, now U.S. Pat. No. 5,598,442.

Application Ser. No. 08/261,561, filed Jun. 17, 1994, entitled "Enhanced Input-Output Element," and assigned to the assignee of this application, now U.S. Pat. No. 5,513,377.

Application Ser. No. 08/261,523, filed Jun. 17, 1994, entitled "Attached Storage Media Link," and assigned to the assignee of this application.

Application Ser. No. 08/261,641, filed Jun. 17, 1994, entitled "Shared Channel Subsystem," and assigned to the assignee of this application, now U.S. Pat. No. 5,522,088.

BACKGROUND OF THE INVENTION

1. Field of the Invention

This invention relates to an improved method and apparatus for transmitting digital data at high speeds via a parallel data bus, and more particularly, to a method and apparatus to provide a cost effective, scalable communications network for parallel processing systems while eliminating precise bus length and system clock rates as a critical or limiting factor in system design.

2. Description of the Prior Art

As will be appreciated by those skilled in the art, such factors as noise and loading limit the useful length of parallel busses operating at high data rates. In the prior art, the length of the bus must be taken into account in the system design and the bus length must be precisely as specified. Manufacturing tolerances associated with physical communication link (chips, cables, cord wiring, connectors, etc.) and temperature and variations in power supply voltage also limit the data rates on prior art busses comprised of parallel conductors. Further, many prior art computer systems transfer data synchronously with respect to a processor clock, so that a change in processor clock rate may require a redesign of the data transfer bus.

An increasingly popular means of providing low cost, high capacity compute capability is to couple a number of computer resources together via a high speed switch network. This allows them to communicate readily with each other to share work as well as to readily access system resources such as DASD, print servers, file servers, archival systems, boot servers, etc., either directly or via gate-way nodes. Typically the number of such network connections scales at least linearly with the number of nodes and in many cases goes up geometrically. As a result, the link technology is a significant component of the total system in terms of cost, reliability, space, power, and can limit the communication subsystems' performance and hence the total machine's performance.

SUMMARY OF THE INVENTION

An object of this invention is the provision of a cost effective bus data transfer system that can operate at high data transfer rates without tight control of the bus length, and without system clock constraints; a system in which the maximum bus length is limited only by the attenuation loss in the bus.

Another object of the invention is the provision of a general purpose, low cost, high performance, point to point data communication link where the width and speed of the interface can easily be modified to tailor it to specific bandwidth requirements and to specific implementation technologies, including VLSI technologies.

A further object of the invention is the provision of a bus data transfer system that operates a clock speed equal to the data rate.

A more specific object of the invention is the provision of a system that adjusts the phase or arrival time of the incoming data on the receive side so it can be optimally sampled by the local receive clock, compensating for many of the manufacturing tolerances associated with the physical link (chip, cable, card wiring, connectors, etc.) as well as temperature changes and power supply output variations.

A further object of the invention is the provision of a low cost, modular, high bandwidth, highly reliable interconnect for structuring moderately parallel systems comprised of microprocessors as well as for parallel processing machines from just a few processing nodes to thousands of processing nodes.

Still another object of the invention is the provision of a semi-synchronous network linking together a number of processors.

Briefly, this invention contemplates the provision of a self-timed interface (STI) in which a clock signal clocks bit serial data onto a parallel, electrically conductive bus and the clock signal is transmitted on a separate line of the bus. The received data on each line of the bus is individually phase aligned with the clock signal. The received clock signal is used to define boundary edges of a data bit cell individually for each line and the data on each line of the bus is individually phase adjusted so that, for example, a data transition position is in the center of the cell. At the data rates contemplated in the application of this invention, the propagation delay is significant. However, within limits, the bus length is not critical and is independent of the transmit and received system clock. The phase adjustment can compensate for a skew of up to several bit cells across the width of the bus. The self-timed interface is used to link together a number of processors in a network that is readily scalable.

BRIEF DESCRIPTION OF THE DRAWINGS

The foregoing and other objects, aspects and advantages will be better understood from the following detailed description of a preferred embodiment of the invention on with reference to the drawings, in which.

DETAILED DESCRIPTION OF A PREFERRED EMBODIMENT OF THE INVENTION

Figure 1:
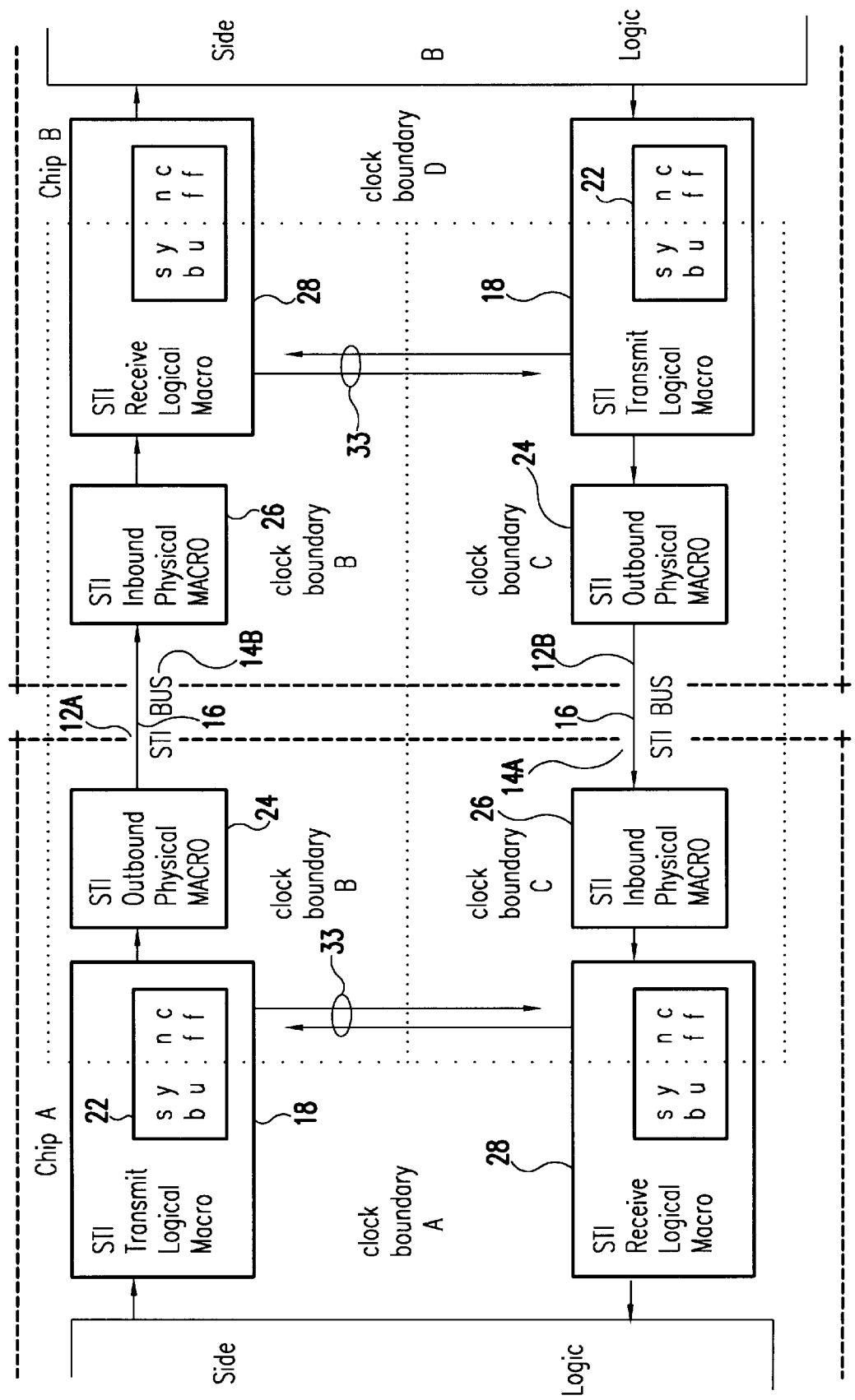
FIG. 1 is an overview block diagram illustrating the application of a self-timed interface, in accordance with the teachings of this invention, to data communication among computer chips.

Referring now to FIG. 1 of the drawings, it illustrates one embodiment in which a self-timed interface in accordance with the teachings of this invention can be used. This exemplary embodiment of the self-timed interface provides data communications between two microprocessor chips, labeled here as Chip A and Chip B. However, as will be apparent to those skilled in the art, the self-timed interface of this invention is applicable to provide data transfer between a wide variety of components or nodes.

Chip A has a transmit port labeled 12A and Chip B has a transmit port labeled 12B. Similarly, Chips A and B have receive ports labeled 14A and 14B, respectively. The ports are connected by two self-timed interface busses 16; one for each transmission direction. In this exemplary embodiment of the invention, each bus 16 is one byte wide, and comprised of nine electrical conductors; eight conductors for data and one conductor for a clock signal.

Each transmit port (12A and 12B) includes a transmit logical macro 18 that provides a logical interface between the host logic and the self-timed interface link 16. Sync buffers 22 provide an interface between the host clock and the self-timed interface clock. This allows the self-timed interface link to run at a predetermined cycle time that is independent of the host clock, making the self-timed interface link independent of the host. An outbound physical macro 24 serializes a word-wide data flow into a byte-wide data flow that is transmitted along with the clock on the self-timed interface link 16.

Each receive port (i.e., 14A and 14B) includes an inbound physical macro 26 that first dynamically aligns each data bit with the self-timed interface clock signal. It aligns any bits with skew up to three bit cells and deserializes the bytes into words. A receive logical macro 28 provides an interface between the self-timed interface receiver logic and the host logic and generates link acknowledge signals and link reject signals, which are coupled by internal links 33 and transmitted back to the transmitting port via an outbound self-timed interface link 16. In order to compensate for variations in electrical path delay, the phase of the incoming data is adjusted, or self-timed. Each bit (line) is individually phase aligned to the transmitted reference clock and further aligned to compensate, within embodiment, for up to three bit cells of skew between any two data lines. The self-timing operation has three parts. The first is to acquire bit synchronization; the second is byte/word alignment; and the third is maintaining synchronization.

In acquiring bit synchronization, the link takes itself from a completely untimed state into synchronous operation. Any previous condition on the STI interface or logic is disregarded with a complete logic reset. The bit synchronization process can be rapidly established, for example on the order of 200 microseconds. The phase of the incoming data is manipulated on a per line basis until the data valid window or bit interval is located. This is accomplished using a phase detector that locates an average edge position on the incoming data relative to the local clock. Using two phase detectors one can locate two consecutive edges on data and these two consecutive edges define the bit interval or data valid window. The data to be sampled by the local clock is the phase of the data located halfway between the two edges of the data.

Figure 4:
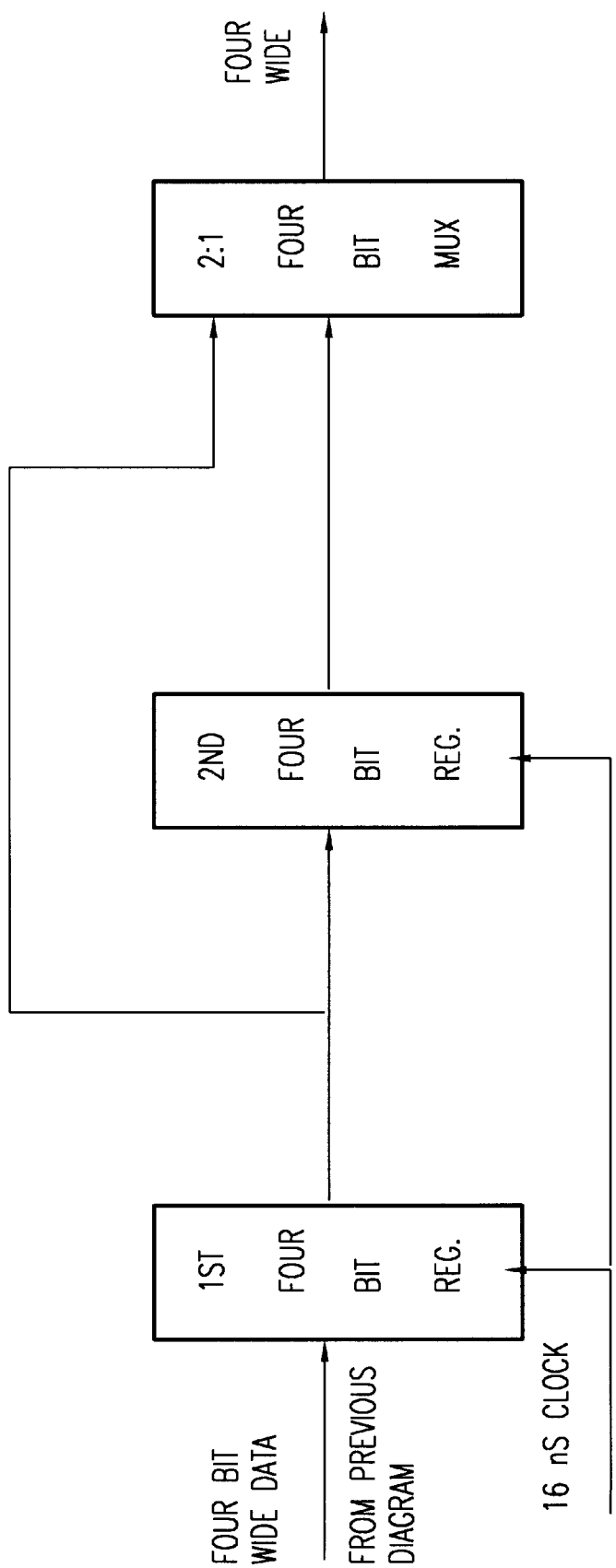
FIG. 4 is a block diagram illustrating the next step in the byte synchronization process.

Byte alignment takes place by manipulating the serial data stream in whole bit times to properly adjust the byte position relative to a deserializer output. Referring now to FIG. 4, word alignment takes place next by manipulating the deserializer data four bit intervals at a time to ensure proper word synchronization on the STI interface. A timing sequence allows proper bit, byte and word synchronization.

Synchronization maintenance occurs as part of the link operation in response to temperature and power supply variations.

Figure 2:
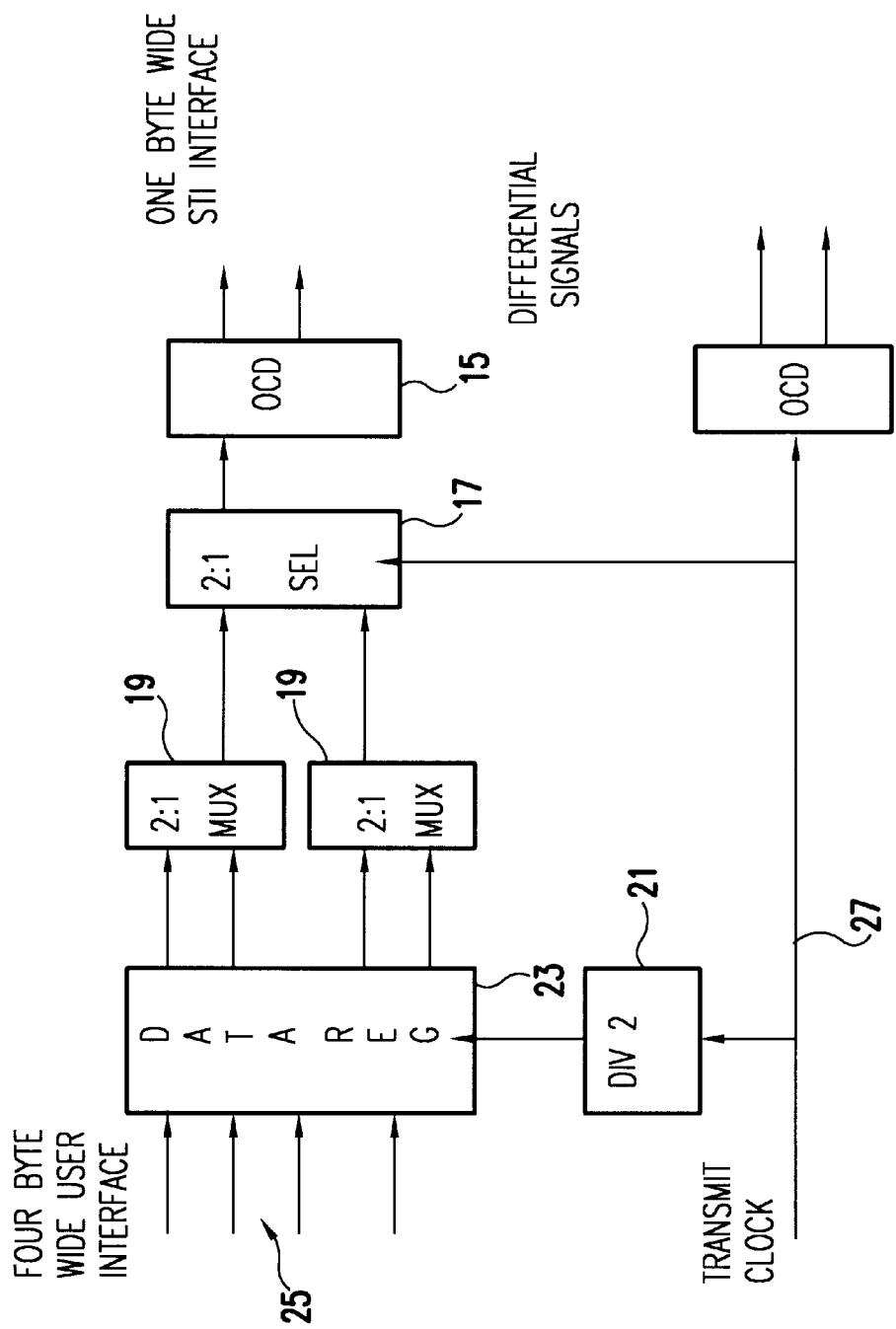
FIG. 2 is a block diagram illustrating one embodiment of a transmitter serializer for implementing a self-timed interface in accordance with this invention.

Referring now to FIG. 2, which illustrates one embodiment of a transmit serializer for a bit serial byte parallel interface used in the practice of the invention. Here a four byte wide data register 23 receives parallel inputs 25 (bytes 0, 1, 2 and 3 inputs shown here) and multiplexers 19 and 2:1 selector 27 multiplex the register output to a one byte wide output of off chip driver 15 coupled to a self-timed interface bus. Data is clocked from the register 23 by divide-by-two logic 12 whose input is self-timed interface clock signal on line 27. Bit zero from bytes 0, 1, 2 and 3 are serialized and transmitted on link 0 of the self-timed interface, shown here. Bit 1 from bytes 0, 1, 2 and 3 will be transmitted on link 1 (not shown) and so on.

To minimize the bandwidth requirements of the communication media the STI clock is one half the frequency of the transmitted data (baud) rate, i.e., a 75 Mhz clock will be used for a 150 Mbit/S data rate. The clock will be generated from an STI oscillator source, this is done to decouple the system or host clock from the STI link. The data will be transmitted with both edges of the clock.

Figure 3:
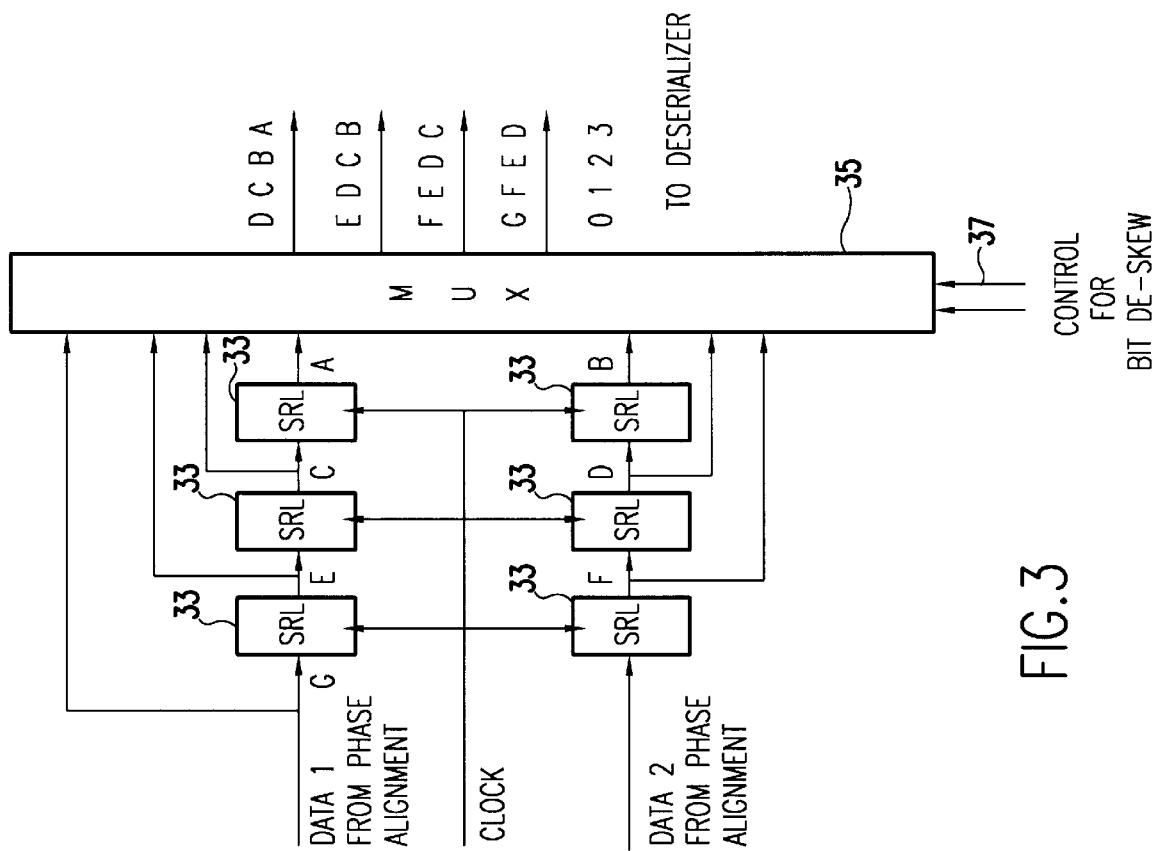
FIG. 3 is a block diagram illustrating byte synchronization in accordance with the invention.

Referring now to FIG. 3, assuming a bit synchronization process as described in connection with 5 has been completed, byte synchronization starts by coupling the phase aligned data (now 2 bits wide) into shift registers 33 whose outputs are coupled to multiplexer 35. Control inputs 37 to the multiplexer are used to deskew the particular data line from the other data lines by whole bit times. The deserializer data output for a particular data line is monitored for an expected timing pattern (e.g., X 0 1 0 where X is a don't care) to determine the proper order of the received data. If at any time a zero is detected in the bit 3 position, the multiplexer is incremented thus moving the byte boundary by one bit time. This process is repeated until the proper byte boundary is located. The multiplexer control wraps around from a binary 3 to a binary 0 in case the correct position was incorrectly passed through the previous time.

This function allows synchronization of data lines skewed by more than an entire bit time.

During normal operation the physical macro will continuously monitor the incoming data to ensure that the optimum clock sampling relationship exists. Small updates will be made to track temperature, power supply and data jitter. These updates will be seamless and transparent to the host logic.

As will be appreciated by those skilled in the art, any of a number of circuits, such as a digital phase lock loop, can be used as the self-timer 52 to provide individual phase synchronization between the clock and the data. However, in a preferred embodiment of the invention, the novel edge detector disclosed in co-pending application Ser. No. 08/262,087 filed Jun. 17, 1994, and assigned to the assignee of this application, now U.S. Pat. No. 5,478,095 and incorporated herein by reference.

Figure 5:
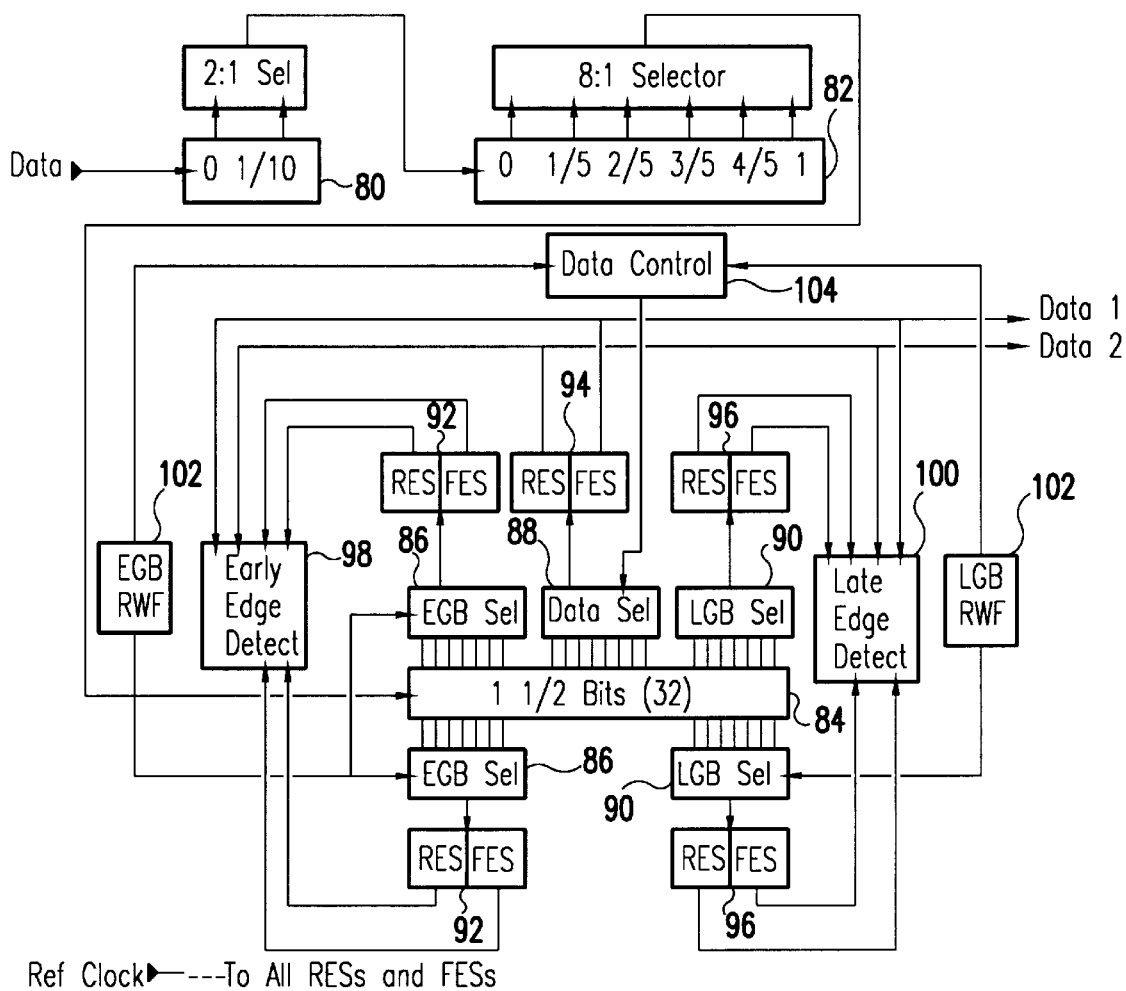
FIG. 5 illustrates phase alignment and sampling logic in accordance with a preferred embodiment of the invention.

Referring now to FIG. 5, in this embodiment of the invention, the clock rate is the same as the data rate. The data edges that define a data window are each detected independently of the other and the data is sampled at the midpoint between the edges when the edges have been aligned with the clock. The position of the edges of incrementally separated phases of the input data stream are successively compared to the position of the rising and falling edges of the clock in order to locate the edges of the data stream with respect to both edges of the clock (e.g., the rising and falling edges).

The data phase pairs are generated in this specific embodiment of the invention by three incrementally selectable delay elements 80, 82, and 84. For example, the elements 80 and 82 provide delays, respectively, in ¹⁄₁₀th and ¹⁄₅th bit time increments and element 84 provides fine increments on the order of ¹⁄₂₀th of a bit time. The fine delay element 84 is separated into three groups to provide early edge detection, system data detection, and late edge detection. An early guard band selector 86 successively selects one phase of the data stream to provide an "early" phase of the incrementally separated phases—one for the rising edge and one for the falling edge. Similarly, a late guard band selector 90 successively selects one phase of the data stream to provide a "late" phase of the incremental phases—again one for the rising edge and one for the falling edge. A selector 88 selects incremental phases for the mid-cell system data position.

A selected data phase is coupled as an input to master-slave RES-FES latch pairs 92, 94, and 96. The rising edge data samples are clocked into the RES latches and the falling edge data samples are clocked into the FES latches. The outputs of the RES-FES latch pair 92 are connected to an early edge detector 98. Similarly, the outputs of the RES-FES latch pair 96 are coupled to a late edge detector 100. The RES latch of pair 94 is coupled to the early edge detector 98 and the FES latch of pair 94 is coupled to the late edge detector 100.

Each edge detector (98 and 100) outputs a "lead", a "lag" or a "do nothing" output which indicates the location of a data edge with respect to the reference clock edge location. The output of each edge detector is coupled via a suitable filter 102 (i.e., a random walk filter), back to its respective selector 86 and selector 90, respectively. The selectors shift the phase of the data coupled to the RES-FES latches in the direction indicated, or if "do nothing" is indicated, the phase of the data at that edge is not shifted.

Data control logic 104 controls the system data output by selecting the phase of the data that is halfway between the two data edges when the data edges are aligned with the reference clock. A phase of the data (Data 1 and Data 2) is outputted at each reference clock edge.

In operation of a specific embodiment, at power on the logic will automatically begin the bit synchronization process. A 16 microsecond timer is started, the bulk delays are reset to their minimum delay and a 16 bit counter running off the divided down clock is started. The edge detect circuitry will sample the incoming data with the received reference clock. The edge detector will output a "lead", a "lag" or a "do nothing" signal that indicates the data edge location relative to the reference clock. This signal is filtered by a Random Walk Filter (RWF) and fed-back to the selectors of their respective RES and FES circuits. The selectors shift the phase of the data into the RES and FES as indicated by the edge detector. Each edge detector operates independently of the other. Each will locate the transitions on data relative to the received (ref) clock by manipulating the incoming phase of the data into the edge detector as described above. The phase of the system data is controlled by the data control logic which selects the phase of the data halfway between the two edge detectors. In parallel with the bit synchronization process, the order of bits out of the deserializer are manipulated to the correct order (see byte/word synchronization below). When the 16 microsecond timer trips the algorithm resets a deserializer error latch and restarts the 16 microsecond counter. The deserializer output is compared against the expected timing pattern (X 0 1 0 where X is a don't care). A single miscompare on any cycle during the next 16 microseconds will set the deserializer error latch. When the 16 microsecond counter trips again the algorithm checks the addresses of the EGB, LGB, and data selectors, deserializer error latch. In order for a bit to end the initial bit synchronization search state, the deserializer output latch must have remained reset AND the all selectors must be properly centered in their tracking range (centering ensures that adjustments can be made to allow for the tracking of temp. and power supply variations after the initial bit synchronization process). If both conditions are not met then the algorithm adds a bulk delay element, resets the 16 microsecond counter and the search process begins once again. Each and every bit (data line) on the STI interface undergoes this process in parallel. Once an individual data line is determined to meet the initial bit synchronization criteria described above it is degated while the other lines continue to be adjusted.

The bit synchronization process is complete once all bits are adjusted and meet the search criteria. The logic will not exit the bit synchronization mode until the 16 bit counter trips.

Finally word alignment takes place. Referring now to FIG. 4, word alignment is established by manipulating the deserializer output bus four bits at a time until word synchronization is established. Note that the first register is shifted by four bit times relative to the second register. Four bit times is the maximum any data bit can be skewed relative to another data bit (3 bit times on link+1 bit time from phase alignment section).

During normal operation the physical macro will continuously monitor the incoming data to ensure that the optimum clock sampling relationship exists. Small updates will be made to track temperature, power supply and data jitter. These updates will be seamless and transparent to the host logic. Approximately ½ a bit time of delay will be needed to compensate for temperature and power supply variations to maintain proper synchronization. This added delay is in the fine delay elements section. There is also circuitry to monitor the position of the guard bands relative to the allowable range of operation. If a guard band reaches the end of its range, two cases exists: 1) a new bulk delay element is added and the fine delay elements are adjusted accordingly. Note this can cause sampling errors in the data. The circuitry that makes these on the fly bulk adjustments can be inhibited so no on the fly bulk delay adjustments are made during normal operation. The second case exists when one of the guard bands reaches the end of its range and the on the fly bulk delay adjustment is inhibited, the physical macro will signal the logical STI macro that a bit synchronization is required soon. The link should finish the immediate work and force the link into timing mode.

Figure 6:
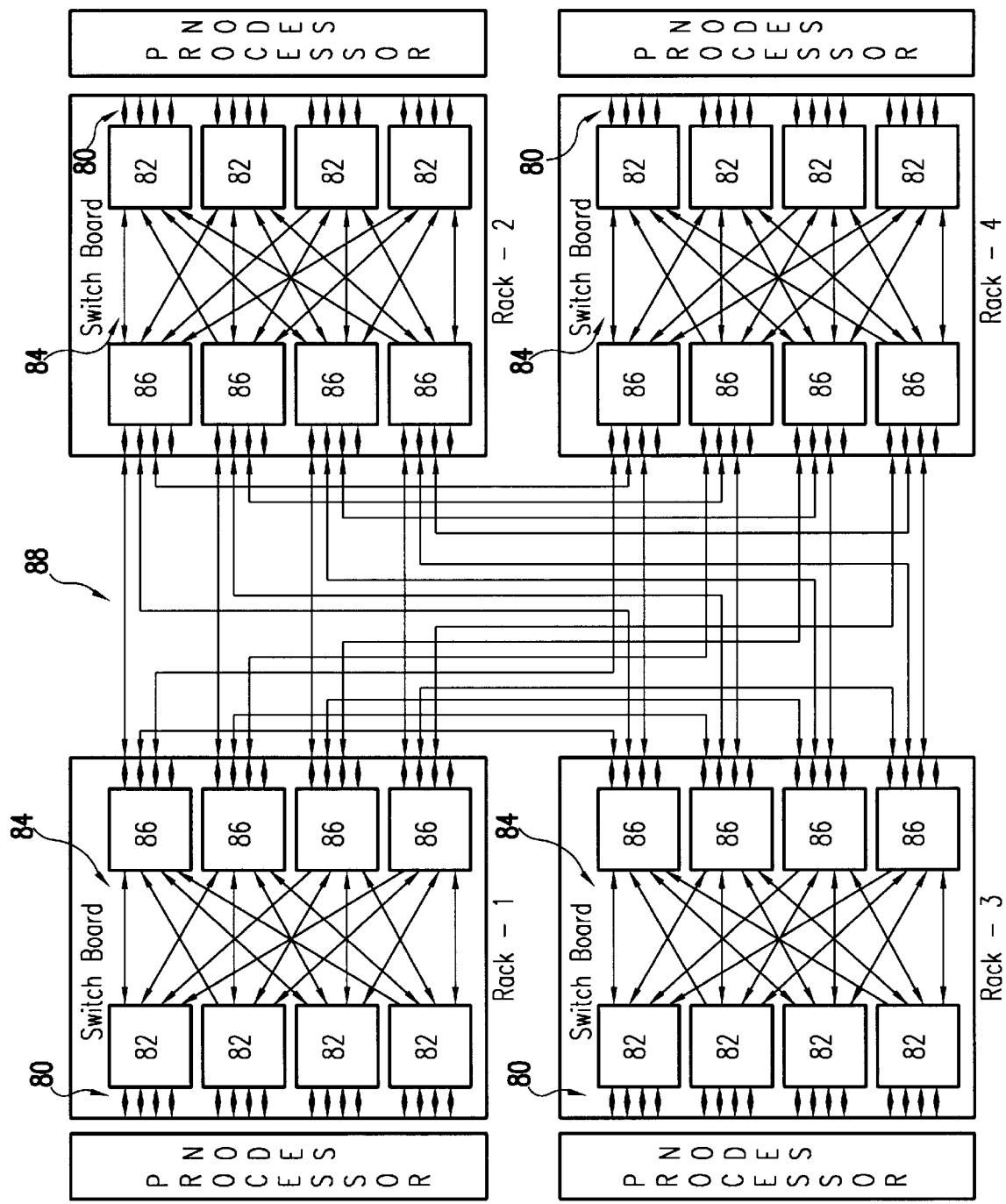
FIG. 6 is a block diagram of a 64 node switching network employing the self timed interface technology in accordance with the teachings of this invention.

Referring now to FIG. 6, it shows an embodiment of the invention in which 64 nodes are connected in parallel by STI links. Each node is a processor in the network and there are four switch boards designated here as Rack-1, Rack-2, Rack-3 and Rack-4. Groups of four processor nodes 80 are connected to non-blocking packet switches 82. A self-timed interface of the type described above cross-connects the switches 82 to similar switch 86. A self-timed interface 88 connects each of the switches 86 and thus each of the nodes 80 in parallel.

Figure 7:
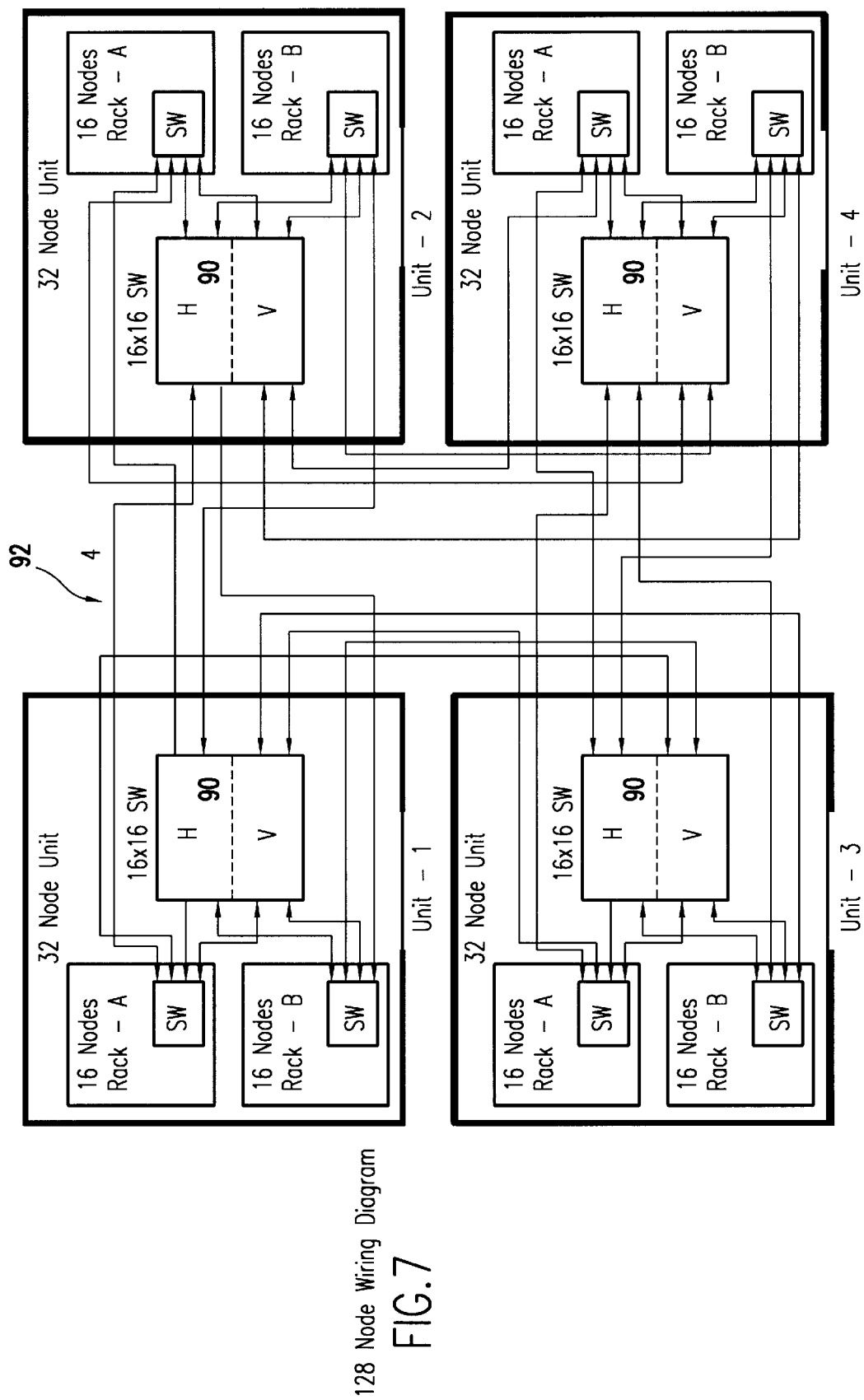
FIG. 7 is diagram similar to FIG. 6 showing the scalability of the 64 node switching network in FIG. 6 to a 128 node network.

FIG. 7 shows how, using STI, a network can be scaled modularly, here to a network that interconnects 128 nodes. Here, eight nodes with 16 nodes each, labeled A and B, are grouped into four 32 node units. Each rack labeled A or B corresponds to a rack labeled Racks-1, 2, 3 or 4 in FIG. 10. The racks A and B for each unit are connected by a self-timed interface to a 16 by 16 switch 90 and the switches 90 for each of the units are connected in a horizontal (H) and vertical (V) orientation by self-timed interfaces 92 as shown. In a similar manner, the number of interconnected nodes can be scaled upward to 512 and so on.

Figure 8:
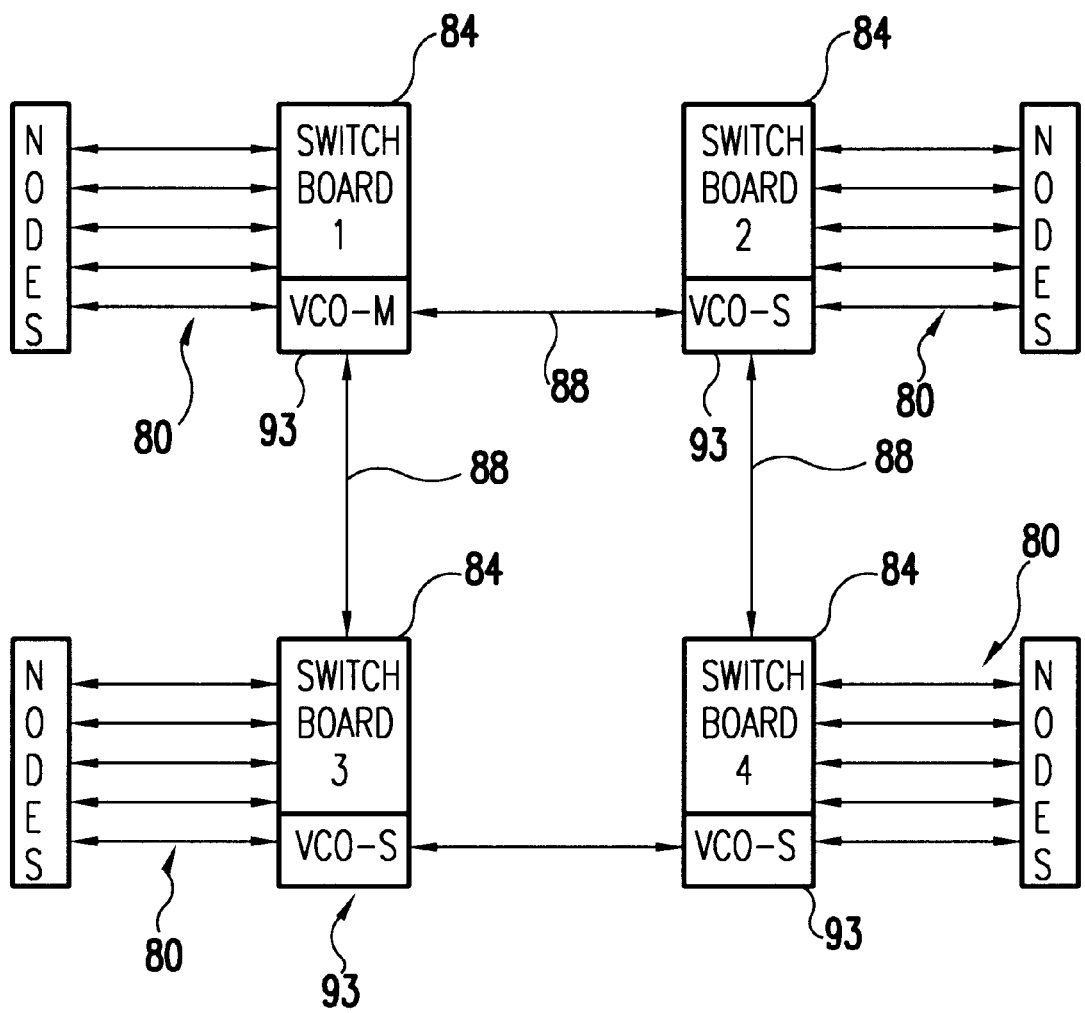
FIG. 8 is a block diagram showing an interconnecting system of nodes operating in a semi-synchronous manner employing a self timed interface in accordance with the teachings of this invention.

FIG. 8 shows, in simplified form, the network of FIG. 7 with a voltage controlled oscillator 93 (VCO) on each switch board. The VCO 93 is used to generate a clock signal at the same frequency as the reference clock input. VCOs are common components readily available in the industry. A reference clock signal from one of the switch boards is selected with control lines during system initialization or upon detection of a clock fault. The selectable reference clock inputs can be any of the incoming STI clocks or a local fixed frequency oscillator. During system initialization one of the switch boards is designated the master, this board's VCo (VCO-M) will use the fixed frequency local oscillator as the reference input. The master's VCO output clock will be distributed to the entire board and will be the clock for the STI ports on that board as well. The STI ports will transmit the master clock to other boards. All other boards will be designated as slave boards (VCO-S). A slave board will select the inbound STI clocks from the master as the reference clock to the VCO. The VCO will output a clock at the same frequency as the inbound STI master clock to be used as the local clock for that board. This process continues through the entire network until all boards are operating at the same frequency referenced to the master clock board. This results in a highly fault tolerant clocking system. Any STI link failure that provides a slave VCO with a reference clock can easily be bypassed by choosing another inbound STI clock to provide the clock to the slave VCO. A master failure could be remedied by simply designating a new master. Note that after initialization the entire network is operating at the same frequency. In order to guarantee synchronous data transfer from one board to another the phase of incoming data must be modified to account for the different physical distance between boards, cable manufacturing tolerances, boards wiring and tolerances, temperature and power supply differences, etc. The STI is used to detect and adjust the phase of the incoming data to properly synchronize it to the local board clock. The STI will also track temperature and power supply variations to ensure that proper synchronization is maintained during normal system operation. We call this type of network or system "semi-synchronous," since it operates differently from conventional system clocking (synchronous) approaches. It is neither a conventional asynchronous or synchronous system, but something somewhere in the middle.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for semi-synchronous transmission of data among a plurality of processors, each of said plurality of processors having a local processor clock, said method including the steps of:

transmitting data bytes from a transmitting processor to a receiving processor in parallel with respective bits of each byte coupled to a separate line of a parallel bus, said bits coupled to each said separate line in response to a transmit clock signal;

transmitting said transmit clock signal from said transmitting processor to said receiving processor on a separate line of said parallel bus;

phase aligning separately, at said receiving processor, each bit on each separate line with said transmit clock signal that has been transmitted to said receiver in the previously recited step of transmitting said transmit clock signal;

synchronizing said local processor clock of said receiving processor with said transmit clock signal.

2. A method for semi-synchronous transmission of data among a plurality of processor units as in claim 1 wherein said plurality of processor units includes three or more processor units and includes the further steps of:

designating one of said processor units as a master processor unit and the remaining processor units as slave processor units;

transmitting said clock signal of said master processor unit to each of said slave units.

3. A method of semi-synchronous transmission of data among a plurality of processor units as in claim 1 wherein said master clock signal is transmitted over multiple paths.

* * * * *